US011067199B2

(12) United States Patent
Lybarger et al.

(10) Patent No.: US 11,067,199 B2
(45) Date of Patent: Jul. 20, 2021

(54) PRESSURE RELIEF VALVE LIFT INDICATOR

(71) Applicant: L6 Inc., Broken Arrow, OH (US)

(72) Inventors: Michael A. Lybarger, Broken Arrow, OK (US); Jud Smalley, Claremore, OK (US)

(73) Assignee: L6 Inc., Broken Arrow, OK (US)

( * ) Notice: Subject to any disclaimer, the term of this patent is extended or adjusted under 35 U.S.C. 154(b) by 0 days.

(21) Appl. No.: 16/676,237

(22) Filed: Nov. 6, 2019

(65) Prior Publication Data

US 2020/0141513 A1 May 7, 2020

Related U.S. Application Data

(60) Provisional application No. 62/756,147, filed on Nov. 6, 2018.

(51) Int. Cl.
*F16K 37/00* (2006.01)
*F16K 17/02* (2006.01)

(52) U.S. Cl.
CPC .......... *F16K 37/0041* (2013.01); *F16K 17/02* (2013.01); *Y10T 137/8242* (2015.04)

(58) Field of Classification Search
CPC . F16K 37/0041; F16K 17/02; Y10T 137/8242
See application file for complete search history.

(56) References Cited

U.S. PATENT DOCUMENTS 3,157,854 A * 11/1964 Riley .................... B60Q 1/447 340/467
3,348,102 A * 10/1967 Bosland .................... G06F 9/02 361/632
3,872,885 A * 3/1975 Eloi .................... B60T 17/226 137/554
4,569,365 A * 2/1986 Namand ................ F16K 17/04 116/277
5,685,336 A * 11/1997 Heiniger ............ F16K 37/0041 137/554
2011/0068725 A1* 3/2011 Bastholm ............ F16H 25/2015 318/468
2014/0116542 A1* 5/2014 Feinauer ............ F16K 37/0041 137/554
2015/0219242 A1* 8/2015 Almazan
2016/0069473 A1* 3/2016 Kucera .............. G01M 3/2876 137/637
2016/0138725 A1* 5/2016 Myers .................... F16K 17/02 137/551

* cited by examiner

*Primary Examiner* — Atif H Chaudry
(74) *Attorney, Agent, or Firm* — Hall Estill Law Firm

(57) ABSTRACT

An apparatus for determining when an operational opening event occurs for a pressure relief valve. The apparatus includes a pressure relief valve lift indicator disposed adjacent to a portion of the pressure relief valve to determine the frequency of the operational opening events of the pressure relief valve. A method of monitoring a pressure relief valve. A pressure relief valve lift indicator is placed in close proximity to the pressure relief valve to determine when the pressure relief valve experiences an operational opening event. Operational data associated with the operational opening event is tracked.

16 Claims, 4 Drawing Sheets

PRESSURE RELIEF VALVE LIFT INDICATOR

CROSS-REFERENCE TO RELATED APPLICATIONS

The present application is a conversion of U.S. Provisional Application having U.S. Ser. No. 62/756,147, filed Nov. 6, 2018, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a pressure relief valve lift indicator for determining the frequency and duration of pressure relief occurrences for a particular pressure relief valve. The present disclosure also relates to a system for monitoring the pressure relief valve lift indicator and corresponding data generated from the pressure relief valve lift indicator.

2. Description of the Related Art

A or pressure relief valve (PRV) is a type of safety valve used to control or limit the pressure in a system; pressure might otherwise build up and create a process upset, instrument or equipment failure, or fire. The pressure is relieved by allowing the pressurized fluid to flow from an auxiliary passage out of the system. The PRV is designed or set to open at a predetermined set pressure to protect pressure vessels and other equipment from being subjected to pressures that exceed their design limits. When the set pressure is exceeded, the PRV becomes the "path of least resistance" as the valve is forced open and a portion of the fluid is diverted through the auxiliary route. The diverted fluid (liquid, gas or liquid-gas mixture) is usually routed through a piping system known as a flare header or relief header to a central, elevated gas flare where it is usually burned and the resulting combustion gases are released to the atmosphere. As the fluid is diverted, the pressure inside the PRV will stop rising. Once it reaches the PRV's reseating pressure, the PRV will close.

Accordingly, there is a need for an apparatus that can determine the frequency the PRV opens and the duration of each time the PRV opens.

SUMMARY OF THE DISCLOSURE

The present disclosure is directed to an apparatus for determining when an operational opening event occurs for a pressure relief valve. The apparatus includes a pressure relief valve lift indicator disposed adjacent to a portion of the pressure relief valve to determine the frequency of the operational opening events of the pressure relief valve.

The present disclosure is also directed to a method of monitoring a pressure relief valve. A pressure relief valve lift indicator is placed in close proximity to the pressure relief valve to determine when the pressure relief valve experiences an operational opening event. Operational data associated with the operational opening event is tracked.

DETAILED DESCRIPTION OF THE DISCLOSURE

Figure 1:
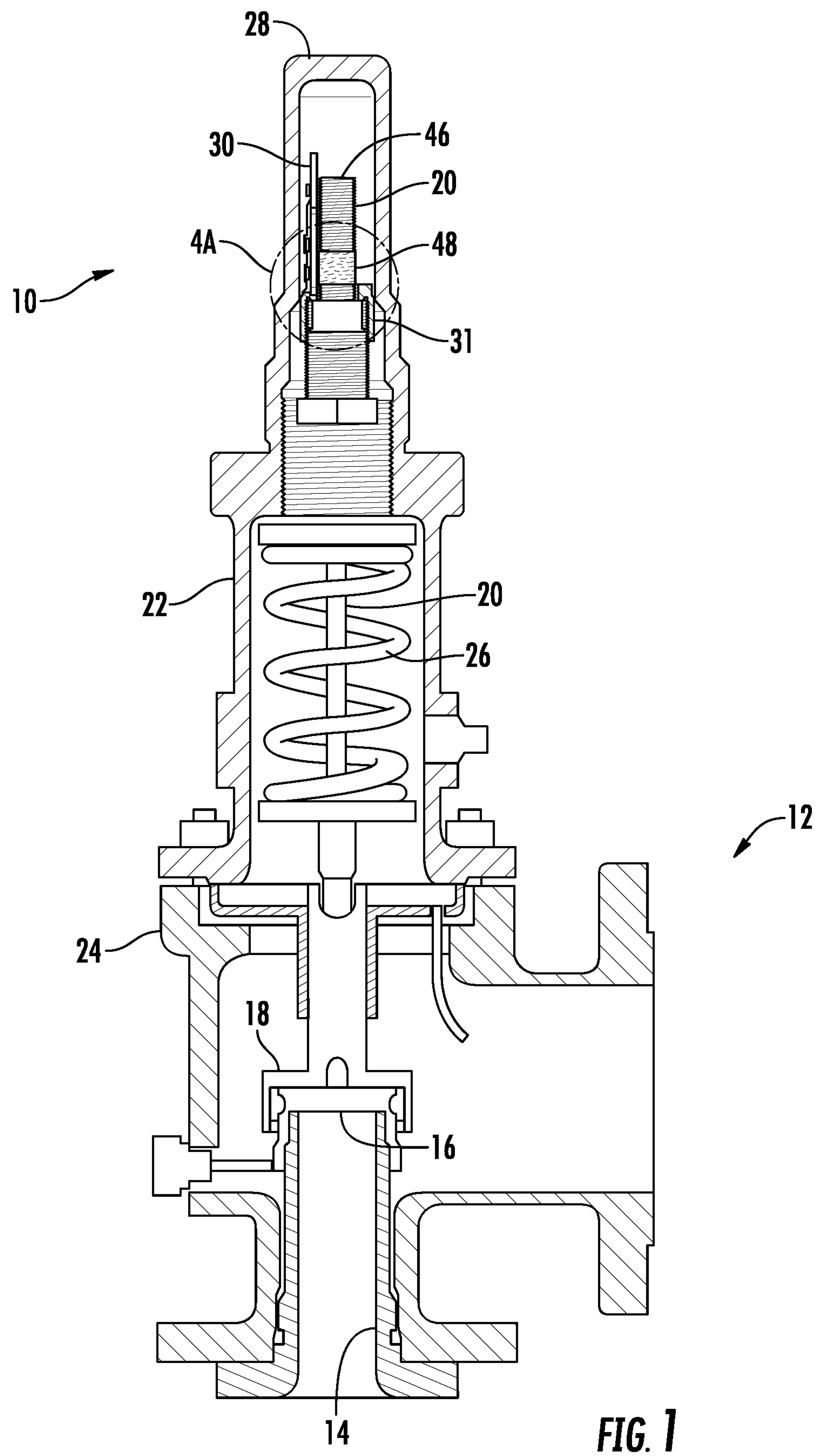
FIG. 1 is an elevational cross-sectional view of a pressure relief valve and a pressure relief valve lift indicator constructed in accordance with the present disclosure.
Figure 2:
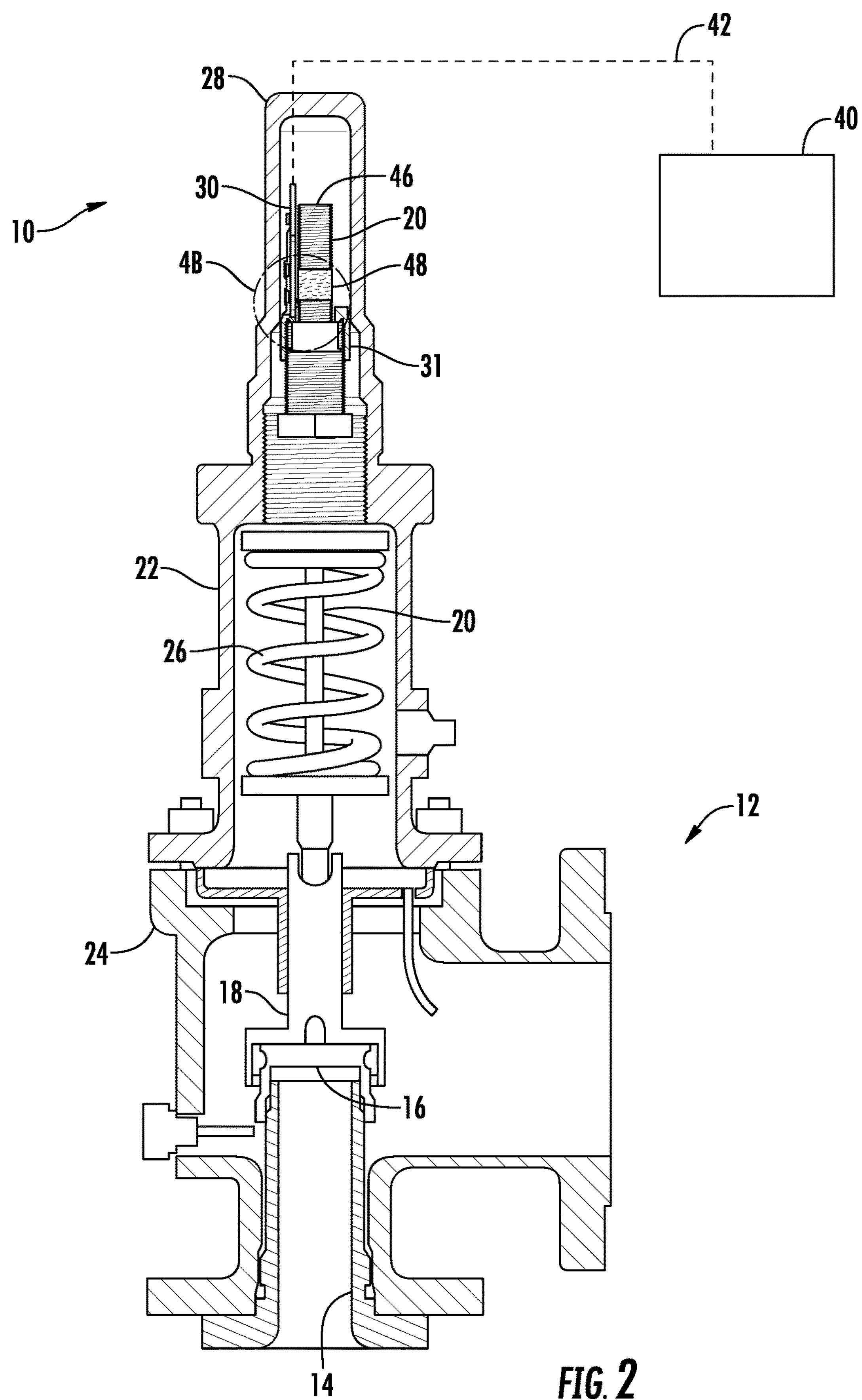
FIG. 2 is another elevational cross-sectional view of the pressure relief valve and the pressure relief valve lift indicator constructed in accordance with the present disclosure.
Figure 3:
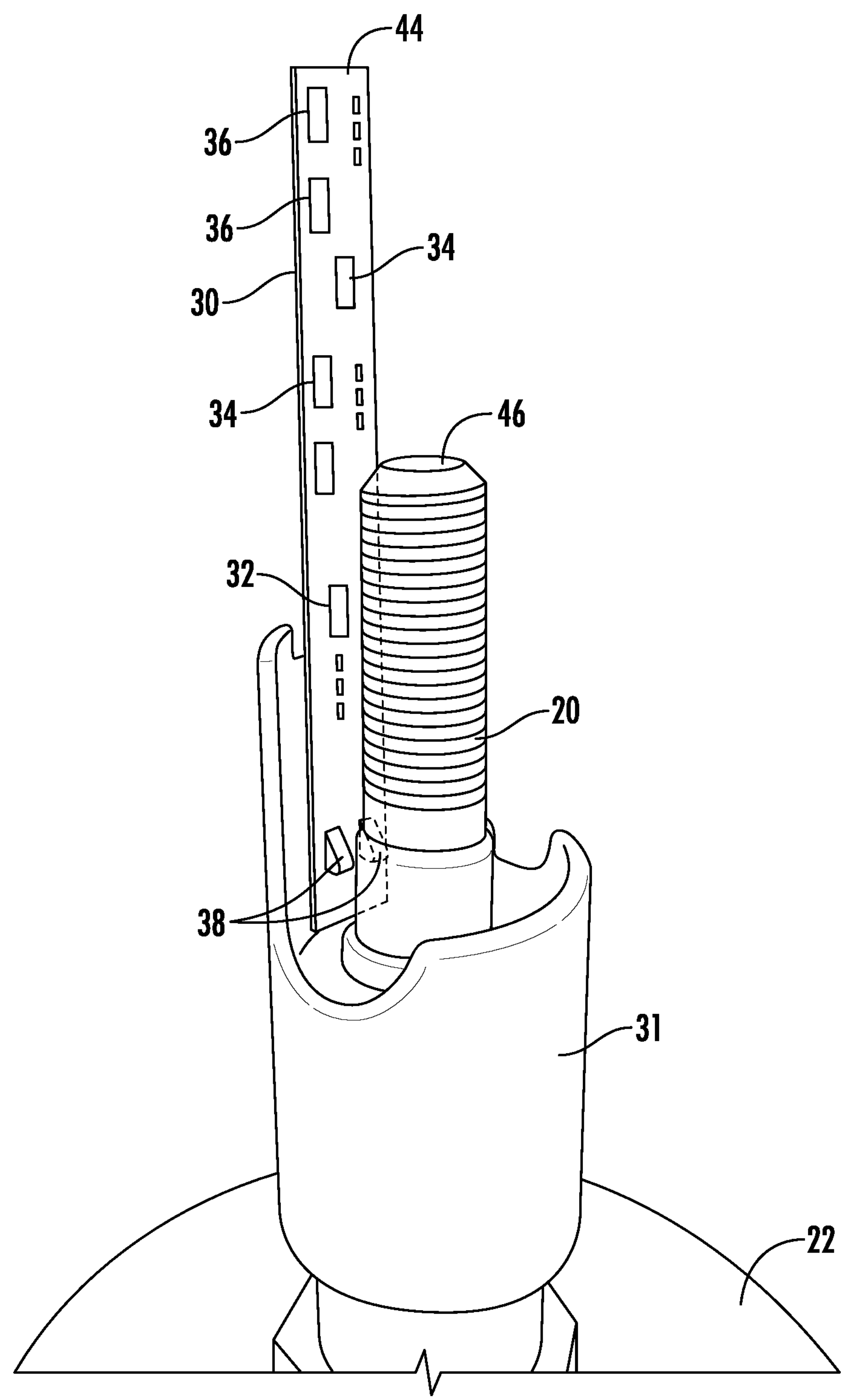
FIG. 3 is a perspective view of the pressure relief valve lift indicator constructed in accordance with the present disclosure.
Figure 4A:
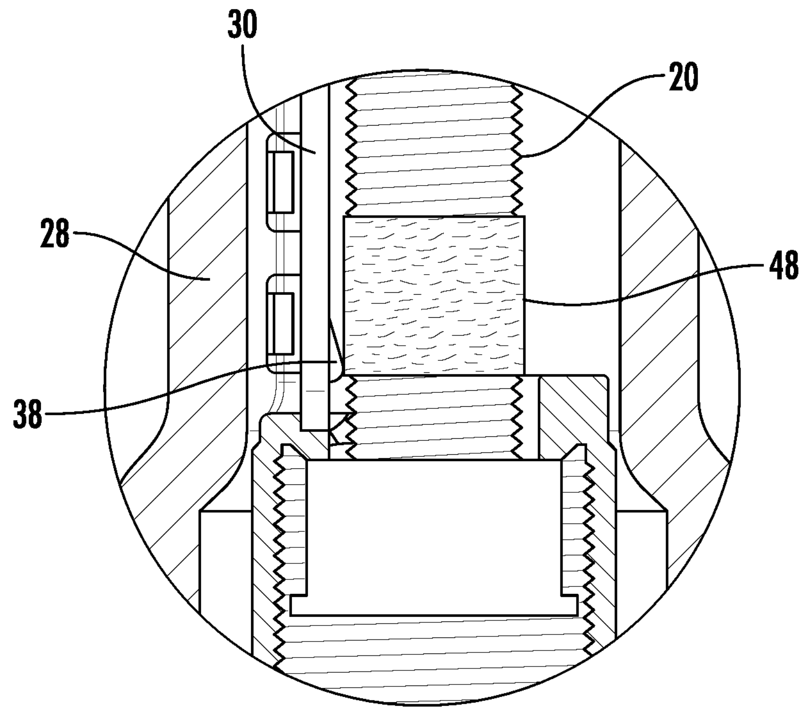
FIG. 4A is a close-up view of a portion of the pressure relief valve and a portion of the pressure relief valve lift indicator shown in FIG. 1 constructed in accordance with the present disclosure.
Figure 4B:
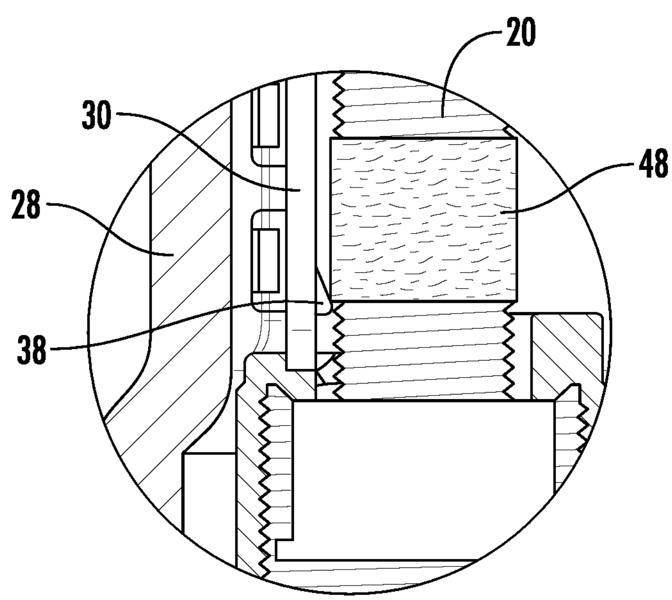
FIG. 4B is a close-up view of a portion of the pressure relief valve and a portion of the pressure relief valve lift indicator shown in FIG. 2 constructed in accordance with the present disclosure.

The present disclosure relates to a pressure relief valve lift indicator 10 for determining the frequency and duration of operational opening events of a pressure relief valve (PRV) 12. The PRV 12 can be any pressure relief valve known in the art including pressure vacuum relief valves. The pressure relief valve lift indicator 10 may also determine other engineering details and/or specifications about the PRV 12. This disclosure also relates to a system and method of monitoring the pressure relief valve lift indicator 10 and a method of managing and storing data corresponding to the operational opening events.

A typical PRV 12 is used to relieve pressure from a pressure system when the pressure of fluid in the pressure system rises to a predetermined pressure. A typical PRV 12 can include an inlet nozzle 14 in fluid communication with the pressure system. The PRV 12 can include a valve seat 16 that is sealingly engagable with the inlet nozzle 14 and a seat holder 18 disposable adjacent to the valve seat 16. The seat holder 18 can be disposed at one end of a set pressure adjusting screw (or valve stem) 20 that is slidably engagable with a bonnet portion 22 of a valve body 24 at the other end of the set pressure adjusting screw 20. A spring 26 can be disposed around the set pressure adjust screw 20 and between the bonnet portion 22 of the PRV 12 and the seat holder 18. A cap 28 can be disposed on the bonnet portion 22 of the valve body 24 to house a portion of the set pressure adjusting screw 20 that extends from the bonnet portion 22 of the valve body 24.

When pressure in the pressure system rises above the predetermined pressure, the valve seat 16 is forced away from the inlet nozzle 14 allowing fluid to flow through and decrease the pressure of the fluid in the pressure system. When the valve seat 16 is forced away from the inlet nozzle 14, the set pressure adjusting screw 20, which extends through the bonnet 22, extends further from the bonnet 22. The pressure relief valve lift indicator 10 can be disposed on, inside or adjacent to the cap 28 and determine when the PRV 12 is an operational opening event. In one embodiment, the pressure relief valve lift indicator 10 can be supported by or mounted to the bonnet portion 22 of the valve body 24. The cap 28 can be disposed around the pressure relief valve lift indicator 10 and the set pressure adjusting screw 20. The pressure relief valve lift indicator 10 can also be mounted to the inside of the cap 28 of PRVs 12. The pressure relief valve lift indicator 10 can be mounted to the inside of caps of existing PRVs. In another embodiment, the pressure relief valve lift indicator 10 can be disposed directly on the set pressure adjusting screw 20. It should be understood and appreciated that the pressure relief valve lift indicator 10 can be mounted or secured to any part of the PRV 12 such that the pressure relief valve lift indicator 10 is capable of determining when an operational opening event has occurred.

The pressure relief valve lift indicator 10 can include a printed circuit board (PCB) 30 with sensors 32 that can detect when the set pressure adjusting screw (or stem) 20 has moved, thus indicating that the PRV 12 is in an operational opening event. The PCB 30 can be mounted on a support structure 31 that can be mounted to various parts of the PRV 12. The sensors 32 for the pressure relief valve lift indicator 10 can be contact or non-contact sensors. The pressure relief valve lift indicator 10 could be in communication, wirelessly or otherwise, with a computer system 40 via a communication link 42. The computer system 40 could include a processor, memory, a graphical user interface (GUI), or any other known hardware component or software used in computer systems 40. The pressure relief valve lift indicator 10 itself may include a processor 34, memory 36 and any other hardware component necessary to make operation of the pressure relief valve lift indicator 10 achievable. The memory 36 of the pressure relief valve lift indicator 10 and/or the memory associated with the computer system that monitors the pressure relief valve lift indicator 10 can store the data collected by the pressure relief valve lift indicator 10. The pressure relief valve lift indicator 10 can also include any necessary hardware or software to facilitate the operation of the pressure relief valve lift indicator 10 as described herein.

In one embodiment, the pressure relief valve lift indicator 10 includes two metallic protrusions 38 that are part of an open circuit. In one embodiment, the protrusions 38 are designed such that they are forced outwardly from the PCB 30, but are permitted to flex back towards the PCB 30 when force is applied to them. In another embodiment, the protrusions 38 are rigidly mounted to the PCB 30 and the PCB 30 can flex when the protrusions 38 are contacted by part of the PRV 12, such as the valve stem 20.

In a further embodiment, when the PRV 12 is in the operational opening event, the valve stem 20 contacts the two metallic protrusions 38, which closes the circuit. The protrusions 38 can be contacted by any portion of the valve stem 20. In one embodiment, a top portion 46 of the valve stem 20 will contact the protrusions 38 to close the circuit. The closed circuit sends a signal to the pressure relief valve lift indicator 10 and/or the computer system 40 that an operational opening event occurred. The pressure relief valve lift indicator 10 and/or the computer system 40 can count and track the number of times an operational opening event occurs. The pressure relief valve lift indicator 10 can also determine how long the circuit was closed (i.e., the valve stem 20 stayed in contact with the two metallic protrusions), which indicates how long the PRV 12 was open.

In another embodiment, the pressure relief valve lift indicator 10 can be mounted to the valve stem 20 wherein the protrusions 38 contact a metallic device secured within the cap 28 wherein the metallic device closes the circuit and confirms that an overpressure event occurred. In yet another embodiment, the pressure relief valve lift indicator 10 can include a single protrusion 38 that sends a signal to the pressure relief valve lift indicator 10 when the single protrusion contact the valve stem 20 of the PRV 12 that an operational opening event has occurred.

The pressure relief valve lift indicator 10 can be configured with a USB connector 44 to be connected to the computer system 40 via a USB port of the computer system 40. The pressure relief valve lift indicator 10 can have the USB connector 44 attached to the pressure relief valve lift indicator 10 or it can be connected to the pressure relief valve lift indicator 10 via a wire.

In another embodiment of the present disclosure, a portion of the valve stem 20 has an insulation layer 48 disposed around it. The insulation layer 48 is disposed on the valve stem 20 at a location such that the protrusions 38 contact the insulation layer 48 when the PRV 12 is in a closed position and the protrusions 38 contact a part of the valve stem 20 when the PRV 12 was experiencing an operational overpressure event. The insulation layer 48 can be any material that can prevent the valve stem 20 and the protrusions 38 from making electrical contact, permit the protrusions 38 to contact the valve stem 20 during the overpressure event and permit the insulation layer 48 to prevent contact with the protrusions 38 when the overpressure event ceases. The insulation layer 48 can be disposed on the valve stem 20 in any manner known in the art to accomplish the purpose of the pressure relief valve lift indicator 10 described herein including, but not limited to, shrink wrapping the insulation layer 48 on the valve stem 20.

The present disclosure is also directed towards a method of determining the number of overpressure events the PRV 12 experienced during a specific amount of time, the duration of each overpressure event and when the overpressure event occurred. The data collected from the pressure relief valve lift indicator 10 can be stored and sorted for use by the operator of the PRV 12.

From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. An apparatus, the apparatus comprising:

a pressure relief valve lift indicator disposed adjacent to a portion of a pressure relief valve to determine the frequency of operational opening events of the pressure relief valve, the lift pressure relief valve lift indicator includes:

a printed circuit board with a first and second protrusion disposed thereon;

an electronic loop to indicate an operation opening event of the pressure relief valve, each protrusion contacts a part of the pressure relief valve to close the electronic loop between the first and second protrusions when the pressure relief valve experiences the operational opening event, the first and second protrusion are disposed on the printed circuit board such that when the pressure relief valve experiences the operational opening event, the first and second protrusion contacts the part of the pressure relief valve at essentially the same time.

2. The apparatus of claim 1 wherein the pressure relief valve lift indicator is disposed adjacent to a valve stem of the pressure relief valve.

3. The apparatus of claim 1 wherein the first and second protrusions are positioned so that a portion of the valve stem contacts the first and second protrusions during an operational opening event.

4. The apparatus of claim 1 wherein the pressure relief valve lift indicator further includes at least one memory for storing operational data relative to an operational opening event of the pressure relief valve and a processor for operating the pressure relief valve lift indicator.

5. The apparatus of claim 4 wherein the operational data of the pressure relief valve is the number of times the pressure relief valve experienced an operational opening event during a predetermined amount of time, the duration of each operational opening event and when each operational opening event occurred.

6. The apparatus of claim 5 wherein the pressure relief valve lift indicator is in communication with a computer system via a wired or wireless communication link to provide the operational data to the computer system.

7. The apparatus of claim 6 wherein the pressure relief valve lift indicator further includes a USB connector for providing a connection point for a wired communication link to the computer system.

8. The apparatus of claim 1 wherein the at least two protrusions are contacting an insulation layer disposed on a portion of the valve stem when the pressure relief valve is not experiencing an operational opening event and the at least two protrusions slide off the insulation layer and contact the portion of the valve stem when the operational opening event does experience an operational opening event.

9. A method of monitoring a pressure relief valve, the method comprising:

providing a pressure relief valve lift indicator in close proximity to the pressure relief valve to determine when the pressure relief valve experiences an operational opening event, the lift pressure relief valve lift indicator includes:

a printed circuit board with a first and second protrusion disposed thereon;

an electronic loop to indicate an operation opening event of the pressure relief valve, each protrusion contacts a part of the pressure relief valve to close the electronic loop between the first and second protrusions when the pressure relief valve experiences the operational opening event, the first and second protrusion are disposed on the printed circuit board such that when the pressure relief valve experiences the operational opening event, the first and second protrusion contacts the part of the pressure relief valve at essentially the same time; and tracking operational data associated with the operational opening event.

10. The method of claim 9 further comprising storing the operational data on a memory of the pressure relief valve lift indicator and transmitting the operational data to a computer system via a communication link.

11. The method of claim 10 wherein the operational data of the pressure relief valve is the number of times the pressure relief valve experienced an operational opening event during a predetermined amount of time, the duration of each operational opening event and when each operational opening event occurred.

12. The method of claim 9 wherein the pressure relief valve lift indicator is disposed adjacent to a portion of a valve stem of the pressure relief valve.

13. The method of claim 12 wherein the first and second protrusions are positioned so that a portion of the valve stem contacts the first and second protrusions during an operational opening event.

14. The method of claim 12 wherein the pressure relief valve lift indicator is in communication with a computer system via a wired or wireless communication link to provide the operational data to the computer system.

15. The method of claim 14 wherein the pressure relief valve lift indicator further includes a USB connector for providing a connection point for a wired communication link to the computer system.

16. The method of claim 9 wherein the first and second protrusions are contacting an insulation layer disposed on a portion of the valve stem when the pressure relief valve is not experiencing an operational opening event and the first and second protrusions slide off the insulation layer and contact the portion of the valve stem when the lift pressure relief valve does experience an operational opening event.

* * * * *